United States Patent Office 3,238,140
Patented Mar. 1, 1966

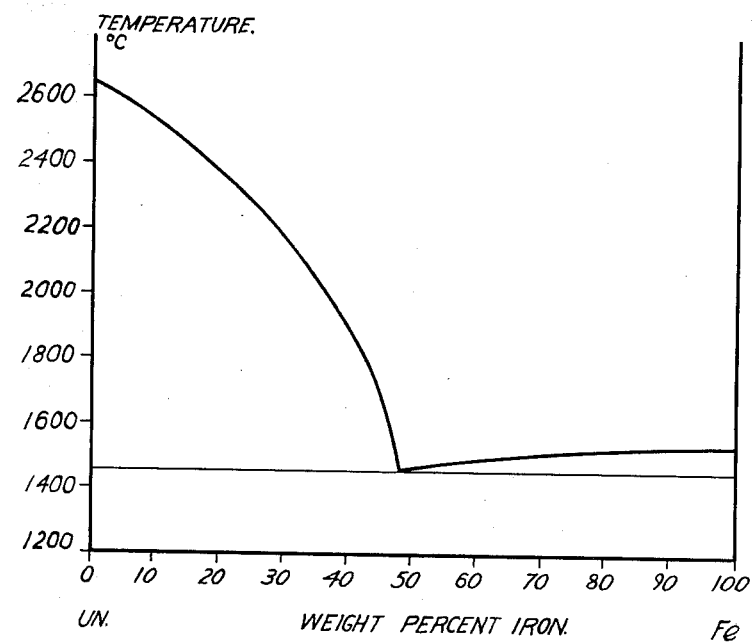

3,238,140
URANIUM NITRIDE-IRON NUCLEAR FUEL CERMETS
Harry John Hedger, Chilton, Didcot, and Jack Williams, Abingdon, England, assignors to United Kingdom Atomic Energy Authority, London, England
Filed Oct. 25, 1962, Ser. No. 233,032
Claims priority, application Great Britain, Nov. 3, 1961, 39,406/61
7 Claims. (Cl. 252—301.1)

The present invention relates to nuclear fuel compositions, particularly those suitable for forming fuel elements for nuclear reactors. More particularly the invention is concerned with a composition including a non-metallic compound dispersed in a metallic matrix, such compositions being known as "cermets."

The object of the present invention is to provide a new or improved nuclear fuel composition.

According to the present invention, there is provided a nuclear fuel composition comprising a dispersion of uranium nitride in iron, such composition melting below 1600° C.

It is important to have the temperature of melting of the composition relatively low, i.e., below 1600° C., as this enables the dispersion to be prepared by casting using conventional techniques to give a material of low porosity and thus show advantages over fabrication by powder metallurgical methods.

It is also possible to permit a low concentration of metallic uranium in the iron phase but it is desirable to reduce this concentration so as to reduce irradiation damage to the iron and the risk of diffusion of uranium metal through the composition and possibly through the walls of a can containing the composition.

In order that the invention may more readily be understood, reference should now be made to the accompanying drawing, which is a phase diagram for the system uranium nitride-iron.

In this phase diagram the melting points of uranium nitride and iron are taken as 2650° C. and 1535° C., respectively.

It will be seen from the phase diagram that the liquidus temperature is 1452° C. for the eutectic composition containing 48% by weight of iron. Consequently the system provides a satisfactory fuel in that a castable composition may be found and it is unlikely that it would melt under any normal conditions of use. Having regard to the maximum casting temperature of 1600° C., compositions containing above 46% by weight of iron would seem to be satisfactory. Calculation shows that, on this basis, compositions containing up to 17 atoms percent of uranium as nitride (the remainder being iron) would be satisfactory. If an allowance is made for a small uranium metal content in the iron phase, compositions containing up to 18 atoms percent of uranium may be considered.

However, if the fuel is to be used in a fast neutron reactor, it is desirable to have the total uranium content relatively high and in any event in excess of 4.26 gm./cc., which places a lower limit of 12 atoms percent of uranium on the usable compositions.

Consequently the preferred composition contains from 12 to 18 atoms percent of uranium and from 12 to 17 atoms percent nitrogen, the remainder being iron and the atomic ratio of nitrogen to uranium being not less than 0.8.

As uranium nitride and plutonium nitride form a complete series of solid solutions, up to 50% of the uranium nitride content may be replaced by an equivalent weight of plutonium nitride, this proportion forming a practical maximum for the plutonium content.

If the fuel is to be used in a fast neutron reactor it will be apparent that it must contain plutonium or uranium-235, the former being preferred.

A typical example of a composition within the terms of the invention is:

5 atoms percent plutonium
11 atoms percent uranium
15–16 atoms percent nitrogen
68–69 atoms percent iron In this example, the variation in the nitrogen content and the consequent variation in the iron content depends on the uranium content of the metallic phase. The melting point of the composition is approximately 1420° C.

The advantage of using uranium nitride is that it is less reactive than the carbide whilst maintaining the useful thermal conductivity of the carbide as opposed to the oxide. The continuous metal phase provides good conductivity and the possibility of metallic bonding to the can.

We claim:

1. A nuclear fuel composition for a fast neutron reactor, consisting essentially of 12 to 18 atoms percent of uranium and 12 to 17 atoms percent of nitrogen, the remainder being iron, and the atomic ratio of nitrogen to uranium being not less than 0.8.

2. The composition of claim 1, wherein up to 50% of the uranium nitride is replaced by an equivalent weight of plutonium nitride.

3. A nuclear fuel composition consisting essentially of a cast body in the form of a dispersion of uranium nitride in a disperse phase of iron, the said body having a melting point below 1600° C.

4. A nuclear fuel composition consisting essentially of a cast body in the form of a dispersion of uranium nitride in a disperse phase of iron, the said body containing more than 46% by weight of iron.

5. The composition of claim 3, wherein the disperse iron phase contains a small quantity of uranium metal dissolved therein.

6. A nuclear fuel composition for a fast neutron reactor, consisting essentially of a cast body in the form of a dispersion of uranium nitride in a disperse phase of iron, the said body containing more than 4.26 gm./cc. of uranium.

7. A nuclear fuel composition for a fast neutron reactor, comprising a cast body in the form of a dispersion of a solid solution of uranium and plutonium nitrides in a continuous disperse phase of iron, said cast body consisting essentially of:

5 atoms percent plutonium
11 atoms percent uranium
15–16 atoms percent nitrogen
68–69 atoms percent iron.

References Cited by the Examiner
FOREIGN PATENTS
1,198,870  12/1959  France.

OTHER REFERENCES
Nuclear Fuel Elements, by Hausner et al.: November 1959, p. 198.

CARL D. QUARFORTH, *Primary Examiner.*
REUBEN EPSTEIN, *Examiner.*